Sept. 8, 1959

A. HAHNEL 2,903,651

SPECTRUM GENERATOR

Filed Feb. 28, 1958

INVENTOR,
ALWIN HAHNEL

BY

Harry M. Saragovitz

ATTORNEY.

United States Patent Office
2,903,651
Patented Sept. 8, 1959

2,903,651

SPECTRUM GENERATOR

Alwin Hahnel, Rochester, N.Y., assignor to the United States of America as represented by the Secretary of the Army Application February 28, 1958, Serial No. 718,382

5 Claims. (Cl. 331—117)

Figures 1, 2A, 2B:
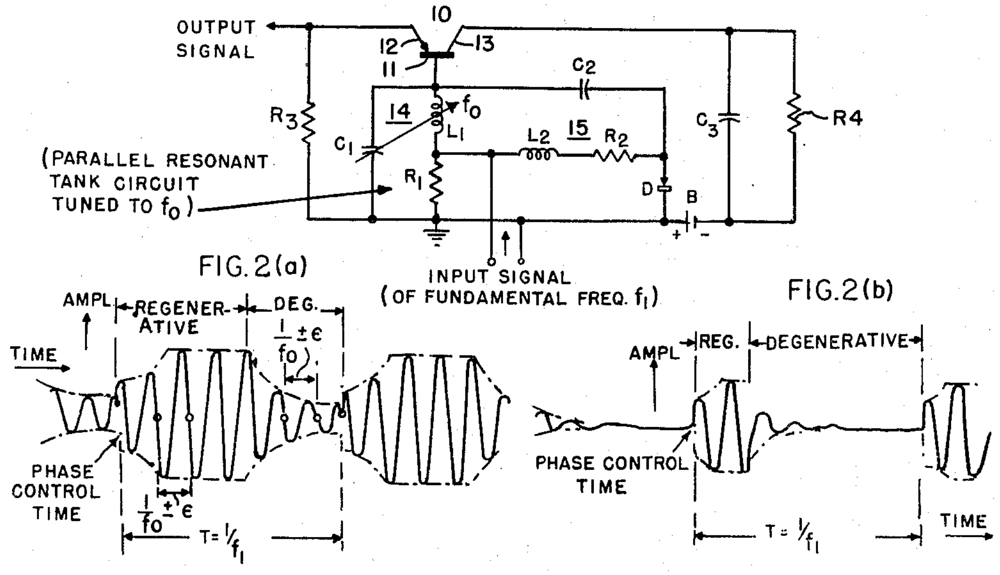

(Granted under Title 35, U.S. Code (1952), sec. 266)

The invention herein described may be used by or for the Government for governmental purposes, without the payment of any royalty thereon.

This invention relates to variable frequency oscillation generators and particularly to oscillators of the periodically phase-controlled type which generate a number of harmonically related frequencies from a fundamental frequency input.

The periodic phase control of an oscillator by an externally generated signal constitutes an effective method of obtaining a multiplicity of harmonically related frequencies. The output of the oscillator so controlled comprises a spectrum of frequencies whose envelope is peaked at the frequency to which the oscillator is tuned. An oscillator employing this mode of operation is termed a "spectrum generator," and may be tuned to the center frequency of the desired spectrum, and be keyed by pulses at the frequency that is the fundamental to the desired spectrum components. A number of different types of such periodically phase-controlled oscillators or spectrum generators, all employing vacuum tubes, are described in articles by the applicant entitled "Multichannel Crystal Control of VHF and UHF Oscillators" and "Phase Controlled Multichannel Oscillator," respectively published in the Proc. of the I.R.E., vol 41, No. 1, January 1953 and in Electronics, April 1955, page 164; and are also disclosed in the applicant's U.S. patent applications Serial Nos. 392,265, filed November 4, 1953, 476,859, Patent 2,868,976, and 476,860, Patent 2,868,977, both filed February 9, 1953, and 564,088, Patent 2,852,679, filed February 7, 1957, or in his U.S. Patents Nos. 2,730,624, 2,745,963 and 2,810,074

A general object of the invention is to generate efficiently and economically a plurality of adjacent high-order harmonics of a given fundamental frequency.

A more specific object is to produce with a relatively simple circuit arrangement containing a small number of inexpensive circuit components and having small power supply requirements a spectrum of high order harmonics of the frequency of an externally supplied signal, such that the spectrum envelope is relatively flat for a number of adjacent harmonics and a high "skirt" selectivity is obtained in the range of undesired harmonics outside this flat region.

The periodically phase-controlled spectrum generator in accordance with the invention employs as its main element a single transistor of the point contact type having the usual base, emitter and collector electrodes properly relatively biased and associated emitter and collector circuits. This transistor oscillator employs a parallel-resonant tank circuit in its base lead, which circuit includes series resistance to lower the circuit Q. Oscillation in this circuit is, as it is well known, effected by making the base impedance so large that a negative circuit resistance results. An input signal of the fundamental frequency is applied to the tank circuit to periodically control, at this frequency, the phase of the oscillations. The output may be taken off in a conventional way, such as across the resistor in the emitter circuit. The tank circuit is tuned to the center frequency of the spectrum of harmonics desired in the output wave.

The disadvantage of conventional spectrum generators is that the desired high order harmonics produced are small in amplitude, and that the undesired spectrum components of the output wave above and below those of the desired ones are of similar amplitudes so that, when such spectrum generators are used in frequency control systems, they may cause undesired responses directly or in combination with other signals. These difficulties are overcome in accordance with the invention by the use of a suitable auxiliary network associated with the tank circuit. This auxiliary network includes a diode and a capacitor in series connected in parallel with the tank circuit and operating as a reactance modulator under control of the applied input signal of fundamental frequency to cause frequency modulation of the inductance-capacitance-resistance combination of that tank circuit in the time intervals between each two successive points of instantaneous phase control. This will result in an output wave having a spectrum envelope which resembles that which could be produced by passing a flat spectrum through a filter having a flat passband and a high shape factor, such that the desired adjacent harmonics are of the same relatively high amplitude and the undesired harmonics of frequencies outside the modulation range are substantially suppressed.

Figure 4:
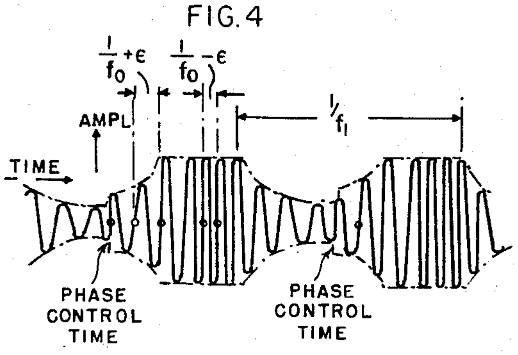
Figure 5:
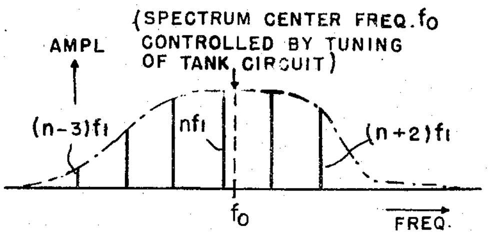

The various objects and features of the invention will be better understood from the following complete description thereof when it is read in conjunction with the several figures of the accompanying drawing in which:

Figure 1 shows schematically the circuit of a periodically phase-controlled transistor oscillator which embodies the invention;

Figures 2 (*a*) and (*b*), and 3 (*a*) and (*b*) show the output wave forms and frequency spectrum, respectively, obtainable with the basic part of the circuit of Figure 1, for different values of resistance in, and thus the Q of the tank circuit; and Figures 4 and 5 respectively show the improved output wave form and frequency spectrum obtainable with the transistor oscillator of Figure 1 by the circuitry added to the basic portion thereof in accordance with the invention.

As shown in Figure 1, the periodically phase-controlled oscillator type of spectrum generator of the invention includes a basic portion which will be described first. It includes a point contact type of transistor 10 having a base electrode 11, an emitter electrode 12 and a collector electrode 13. The point contact transistor 10 may be of the P-N-P type as indicated diagrammatically in this figure. A variable frequency parallel-resonant tank circuit 14 including the inductor $L_1$ and the capacitor $C_1$ is connected between the base-electrode 11 and ground. A resistor $R_1$ is connected in series with the inductor $L_1$ in the tank circuit 14. A resistor $R_3$ is connected between the emitter electrode 12 and the grounded point of the tank circuit 14; and a resistor $R_4$ shunted by a capacitor $C_3$ is connected between the collector electrode 13 and the grounded point of the tank circuit 14. The emitter electrode 12 is biased with respect to the base electrode 11 by the input signal applied across $R_1$, and the collector electrode 13 is biased in the reverse direction with respect to the base electrode 11 by the battery B. The resistance in the transistor base circuit is made large enough so that when the transistor electrodes are correctly biased, oscillations will build up. An input signal of the fundamental frequency $f_1$ is applied to the tank circuit 14 from an external source connected across the resistor $R_1$. The tank circuit 14 by suitable adjustment of the inductor $L_1$ or the capacitor $C_1$, or both, is tuned to the center frequency $f_0$ of the desired harmonics which are the major components of the output wave taken from across the resistor $R_3$ in the emitter circuit.

The operation of the basic portion of the transistor oscillator circuit described above is modified by the use of the auxiliary network 15 associated with the tank circuit 14. This auxiliary network includes a diode D and a capacitor $C_2$ in series forming a reactance modulator, connected in parallel with the tank circuit 14 as shown, and a resistor $R_2$ and an inductor $L_2$ in series connected from a point between the diode D and capacitor $C_2$ to a point between the inductor $L_1$ and the resistor $R_1$ in tank circuit 14, which provides a D.-C. path to the diode D for the signal input applied across resistor $R_1$. The value of the capacitor $C_3$ shunting the resistor $R_4$ in series with the collector circuit is selected such that the collector circuit impedance is low enough at the resonant frequency of the parallel resonant circuit 14 and large enough to prevent low frequency oscillations that could be caused by the use of a large value for the resistor $R_1$ in the resonant tank circuit 14.

Figure 3A:
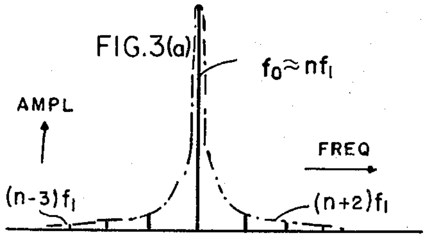
Figure 3B:
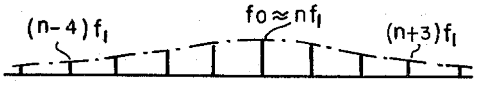

Let it be assumed that the transistor circuit including the $L_1R_1C_1$ tank circuit 14 but not the auxiliary network 15 ($DC_2L_2R_2$), is used. Then the circuit of Figure 1 would be regenerative during each negative half-cycle of the input signal of fundamental frequency $f_1$. During each positive half-cycle of the input signal, however, the point contact transistor 10 will operate in cut-off condition, resulting in the decay of the $f_0$ oscillations that were built up and maintained during the previous negative half-cycle of the controlling input signal $f_1$. At the end of each degenerative period, the circuit energy is low enough to permit build-up of a new train of oscillations at the frequency $f_0$ with the phase of the inherent harmonics of the input signal. The resulting wave forms of the output wave, as shown in Figure 2 (*a*) for the case when the resistor $R_1$ in the tank circuit 14 is of small value, providing a higher Q for that circuit, and in Figure 2 (*b*) for the case where the value of $R_1$ is larger and thus the Q of the tank circuit lower, have regenerative and degenerative periods determined by the wave shape of the input signal and are periodic at the frequency $f_1$ of that signal. Their frequency spectra, respectively shown in Figure 3 (*a*) and 3 (*b*), therefore, contain only frequencies that are harmonically related to the fundamental frequency $f_1$. The frequencies corresponding to adjacent zero crossings of the output wave form do not exist in the output wave. This is a well known fact, and therefore not explained here in detail.

For applications where a number of adjacent harmonics of similar large amplitude are required, the wave form generated in conventional harmonic generators must be of the type shown in Figure 2 (*b*) with the disadvantages, that the spectrum energy is distributed over a wide band and that therefore the desired harmonics are small in amplitude, and the harmonics of frequencies above and below the desired ones are of similar amplitude so as to make possible undesired responses when used in a frequency control system. The basic circuit with the inclusion of the auxiliary $DC_2L_2R_2$ network overcomes these disadvantages in the following manner.

The input signal of frequency $f_1$ not only controls periodically the phase of the output wave form but also causes a frequency modulation of the $L_1C_1R_1$ tank circuit in the time intervals between each two successive points of instantaneous phase control, as shown in the output wave form circuit of Figure 4. The resultant spectrum envelope is shown in Figure 5. As pointed out in applicant's aforementioned article in Electronics, the frequency modulating action of the auxiliary network cannot influence the frequency of the spectrum components as they are always harmonically related to the fundamental frequency $f_1$ and completely frequency independent of any variation of the tuning of the $L_1R_1C_1$ tank circuit. The detuning of the resonant circuit merely relocates the position of the center frequency of the spectrum envelope.

A spectrum generator of the type shown in Figure 1 was designed for and successfully used in the frequency control system of a transistorized multi-channel radio communication receiver. It was found to be particularly advantageous wherever the desired spectrum includes a number of adjacent harmonics of the same high amplitude and where all other harmonics must be suppressed strongly. These desirable characteristics are obtained with the spectrum generator of the invention without the use of the additional selective circuits required in conventional circuits. The spectrum generator of the invention would also be particularly applicable for use in wide range direct-reading frequency meters and frequency multipliers.

Various modifications of the circuits illustrated and described which are within the spirit and scope of the invention will occur to persons skilled in the art.

What is claimed is:

1. A spectrum generator for producing a number of high-order harmonics of a given fundamental frequency $f_1$, comprising in combination, a transistor of the point contact type having a base electrode, an emitter electrode and a collector electrode and associated circuits for connecting these elements to form an oscillating circuit including means for applying proper relative biasing voltages to the emitter and collector electrodes, a base electrode circuit having a parallel-resonant tank circuit including a parallel-connected inductor and capacitor, and a series resistor for controlling the Q of the tank circuit connected between the base electrode and a common reference potential point, an emitter circuit including a second resistor connected between the emitter electrode and said reference potential point, a collector circuit including a third resistor shunted by a second capacitor, connected between the collector electrode and said reference potential point, an input circuit connected across the first resistor in said tank circuit, for applying an input signal of said fundamental frequency $f_1$ thereto to periodically control at that frequency the phase of the output wave form, an output circuit connected across said second resistor in said emitter circuit, for taking off the output wave including the generated harmonics of said fundamental frequency, said tank circuit being normally tuned to the center frequency $f_0$ of the spectrum of the desired harmonics of said fundamental frequency and means for making the spectrum envelope of the harmonic frequencies obtained in the output wave relatively flat over a number of adjacent desired harmonics and to provide a high skirt selectively outside this flat region for substantially suppressing undesired harmonics, comprising an auxiliary network associated with said tank circuit including a diode and a third capacitor in series therewith, connected in parallel with said tank circuit and operating under control of the input signal applied thereto as a reactance modulator to frequency-modulate the inductance-capacitance-resistance network in the tank circuit in the time interval between each two successive points of instantaneous phase control by detuning the tank circuit to relocate the position of the spectrum envelope center during these intervals and thus effectively increase the amplitude of the desired harmonics and relatively reduce the amplitude of the undesired harmonics outside the modulation range.

2. The combination of claim 1, in which said auxiliary network includes a second inductor and a fourth resistor in series providing a direct current path between said diode and said input circuit for applied signals of said fundamental frequency.

3. The combination of claim 1, in which the value of said second capacitor shunting said third resistor is selected such as to make the collector circuit impedance low enough at the resonant frequency of said tank circuit but too high to allow low frequency oscillations to be set up in the oscillator circuit by having said first resistor in said tank circuit of large value.

4. The combination of claim 1, in which the spectrum generator is regenerative during the half-cycles of one polarity of the input signal of fundamental frequency and in each half-cycle of the input signal having the other polarity said transistor operates in cut-off condition resulting in a decay of the oscillations of the frequency $f_0$ that were built up and maintained during the regenerative half-cycle, the length of the regenerative and degenerative periods being determined by the wave shape of the input signal and the wave form being periodic at the fundamental frequency $f_1$.

5. The combination of claim 1, in which the performance of the oscillation generator is unaffected by the auxiliary modulation network when no signal is present in said input circuit, and the effective parallel resistance of the tank circuit is modulated at such a level that during the positive half-cycles of the input signal, the conducting diode causes sufficient decrease of the effective parallel tank resistance to result in the decay of the oscillations in the tank circuit.

No references cited.